Patented Oct. 20, 1925.

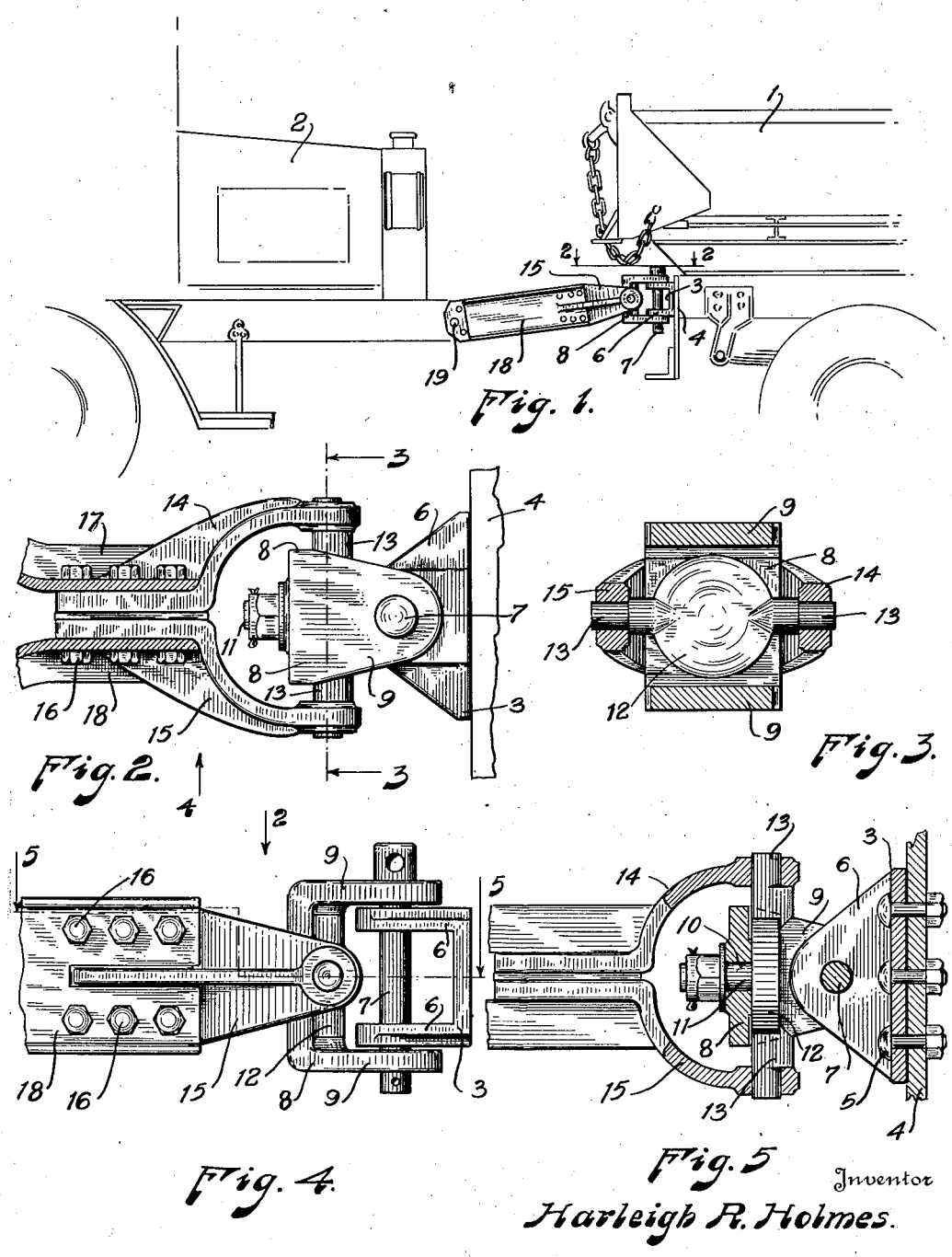

1,557,841

UNITED STATES PATENT OFFICE.

HARLEIGH R. HOLMES, OF LITTLETON, COLORADO.

TRACTOR HITCH.

Application filed January 31, 1925. Serial No. 6,012.

*To all whom it may concern:*

Be it known that I, HARLEIGH R. HOLMES, citizen of the United States of America, residing at Littleton, county of Arapahoe, State of Colorado, have invented certain new and useful Improvements in Tractor Hitches; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in tractor hitches.

It is customary to employ a truck or tractor for the purpose of pulling a number of trailers where freight is transported over highways. In order that the truck or tractor that furnishes the motive power can satisfactorily control one or more trailers, it is essential that the truck and the trailer, and when several trailers are employed, that the adjacent trailers shall be connected by means that makes it possible for the truck or tractor to properly guide and control the trailers. Such a device must have sufficient strength to withstand the tension to which it will be subjected, and sufficient rigidity to resist the compressive strains to which it will be subjected and in addition to this the hitch must be provided with the necessary joints to permit it to accommodate itself to the requirements required by the unevenness of the road.

It is the object of this invention to produce a hitch that shall be so constructed that it will meet all the requirements of heavy work over rough roads and which shall, at the same time, be of simple and substantial construction.

The above, and other objects that will become apparent as the description proceeds are attained by means of a construction that I will now proceed to describe in detail, reference for this purpose being had to the accompanying drawing in which the invention is illustrated and in which—

Fig. 1 is a side elevation of the rear end of a truck showing a trailer attached thereto by means of my improved hitch.

Fig. 2 is a view looking downwardly in the direction of the arrow 2 in Fig. 4 and Fig. 1.

Fig. 3 is a section taken on line 3—3 Fig. 4.

Fig. 4 is a side elevation looking in the direction of the arrow 4 in Fig. 3, and Fig. 5 is a section taken on line 5—5 Fig. 4.

In the drawing numeral 1 indicates the tractor and 2 the trailer. For the purpose of this illustration, the power will be considered to be supplied by the truck 1 through my improved hitch which I will now describe. A U-shaped casting 3 is secured to a transverse frame member 4 of the chassis of the truck by any suitable means, such as bolts 5. The sides 6 of member 3 have openings for the reception of a pin 7 by means of which a second U-shaped member 8 is connected to it. The member 8 has sides 9 which embrace the sides 6 in the manner shown in Fig. 4. The base portion of the U-shaped member 8 has a central opening 10 for the reception of the bolt 11 that projects from one side of the disk 12 and serves to secure the latter rotatably in place on the base 8 in the manner shown in section in Fig. 5. The disk 12 has diametrically opposed lugs 13 to which the curved connectors 14 and 15 are pivotally connected. If we assume that the parts are attached and assembled in such a manner that Fig. 2 is a view looking downwardly upon the parts, then it will be evident that there may be movement about the vertical axis 7 which will take care of curves in the road and movement about the pivot lugs 13 which takes care of the unequalities in the surface curvature of the road, while movement about the axis of the bolt 11 permits relative rotation of the trailer and the truck. Secured to the ends of the members 14 and 15 by means of bolts 16, are draft bars 17 and 18 whose other ends are pivoted at 19 to the trailer 2. The hitch that has just been described is admirably adapted for rough heavy duty on highways as it is adapted to be made very strong and massive and has adjustments that enable it to accommodate itself to the requirements of the roughest and most uneven roads. By removing the bolt 7 the parts may be uncoupled.

Having now described my invention and the manner of constructing and using the same, what I claim as new is:

A tractor hitch comprising a member adapted to be attached to the rear portion of a tractor, said member having a vertical opening adapted to receive a pin, a U-shaped member having a base and two parallel spaced arms adapted to embrace the first mentioned member, said arms having their ends perforated for the reception of a pin, the base having its inner surface flat and provided with a central opening, a disk rotatably secured to the base by means of a bolt that extends through the opening, said disk having two diametrical lugs extending beyond the base and a traction bar pivotally connected to the lugs, said bar having two separable attaching members secured thereto.

In testimony whereof I affix my signature.

HARLEIGH R. HOLMES.